(12) United States Patent
Mohaupt et al.

(10) Patent No.: US 10,266,148 B2
(45) Date of Patent: Apr. 23, 2019

(54) METHOD, COMPUTER PROGRAM AND APPARATUS FOR VERIFYING AUTHORIZATION OF A MOBILE COMMUNICATION DEVICE

(71) Applicant: VOLKSWAGEN AG, Wolfsburg (DE)

(72) Inventors: Matthias Mohaupt, Bochum (DE);
Dong Nguyen, Castrop-Rauxel (DE);
Michael Niederholz, Kamp-Lintfort (DE); Hannes Haupt, Braunschweig (DE); Bastian Bartels, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/660,277

(22) Filed: Jul. 26, 2017

(65) Prior Publication Data
US 2018/0029560 A1    Feb. 1, 2018

(30) Foreign Application Priority Data

Jul. 26, 2016   (DE) .......................... 10 2016 213 704
Sep. 12, 2016   (DE) .......................... 10 2016 217 318

(51) Int. Cl.
*B60R 25/20* (2013.01)
*B60R 25/25* (2013.01)
(Continued)

(52) U.S. Cl.
CPC ............ *B60R 25/209* (2013.01); *B60N 2/002* (2013.01); *B60R 25/252* (2013.01);
(Continued)

(58) Field of Classification Search
CPC . B60R 25/24; B60R 2325/205; B60R 25/241;
B60R 25/243; B60R 25/25;
(Continued)

(56) References Cited

U.S. PATENT DOCUMENTS 8,310,338 B2 * 11/2012 Hamada ................ B60R 25/245
340/5.6
9,508,246 B2 * 11/2016 Okano ..................... H02J 17/00
(Continued)

FOREIGN PATENT DOCUMENTS

DE     102011104230 A1    4/2012
DE     102012204673 A1    9/2012
(Continued)

OTHER PUBLICATIONS

Office Action for Korean Patent Application No. 10-2017-0094887; dated Jul. 2, 2018.

*Primary Examiner* — Yong Hang Jiang
(74) *Attorney, Agent, or Firm* — Barnes & Thornburg LLP

(57) ABSTRACT

A method for checking an authorization of a mobile communication device for operating a vehicle engine of a vehicle which includes determining a position of a mobile communication device. The position of the mobile communication device is inside or outside the vehicle. The method also includes receiving a digital key value from the mobile communication device and checking the authorization of the mobile communication device for operating the vehicle engine, based on the position of the mobile communication device and based on the digital key value.

34 Claims, 6 Drawing Sheets

(51) Int. Cl.
*B60N 2/00* (2006.01)
*G07C 9/00* (2006.01)

(52) U.S. Cl.
CPC .......... *B60R 25/255* (2013.01); *B60R 25/257* (2013.01); *G07C 2009/00261* (2013.01); *G07C 2209/63* (2013.01)

(58) Field of Classification Search
CPC ... B60R 25/252; B60R 25/255; B60R 25/257; B60R 25/209; G07C 9/00309; G07C 2009/00357; G07C 2009/00365; G07C 2009/00388; G07C 2009/00555; G07C 2009/00261; G07C 2209/63; B60N 2/002
USPC .................................................. 340/5.8, 5.81
See application file for complete search history.

(56) References Cited

U.S. PATENT DOCUMENTS

| | | | |
|---|---|---|---|
| 2006/0114100 A1 | 6/2006 | Ghabra et al. | |
| 2010/0235026 A1 | 9/2010 | Shimizu et al. | |
| 2014/0309870 A1* | 10/2014 | Ricci | H04W 4/21 701/36 |
| 2016/0272154 A1* | 9/2016 | Sanji | B60R 25/24 |
| 2017/0250563 A1* | 8/2017 | Davison | H02J 7/025 |

FOREIGN PATENT DOCUMENTS

| | | |
|---|---|---|
| DE | 102013216099 A1 | 2/2014 |
| JP | 2016030892 A | 3/2016 |
| KR | 20150011031 A | 1/2015 |

\* cited by examiner

METHOD, COMPUTER PROGRAM AND APPARATUS FOR VERIFYING AUTHORIZATION OF A MOBILE COMMUNICATION DEVICE

PRIORITY CLAIM

This patent application claims priority to German Patent Application Nos. 10 2016 213 704.2, filed 26 Jul. 2016, and 10 2016 217 318.9, filed 12 Sep. 2016, the disclosures of which are incorporated herein by reference in their entireties.

SUMMARY

Illustrative embodiments relate to a method, a computer program and an apparatus for checking an authorization of a mobile communication device for operating a vehicle engine of a vehicle.

BRIEF DESCRIPTION OF THE DRAWINGS

Disclosed embodiments are described in more detail below on the basis of the drawings, to which, however, exemplary embodiments generally are not restricted overall. In the drawings.

DETAILED DESCRIPTION

Figure 1:
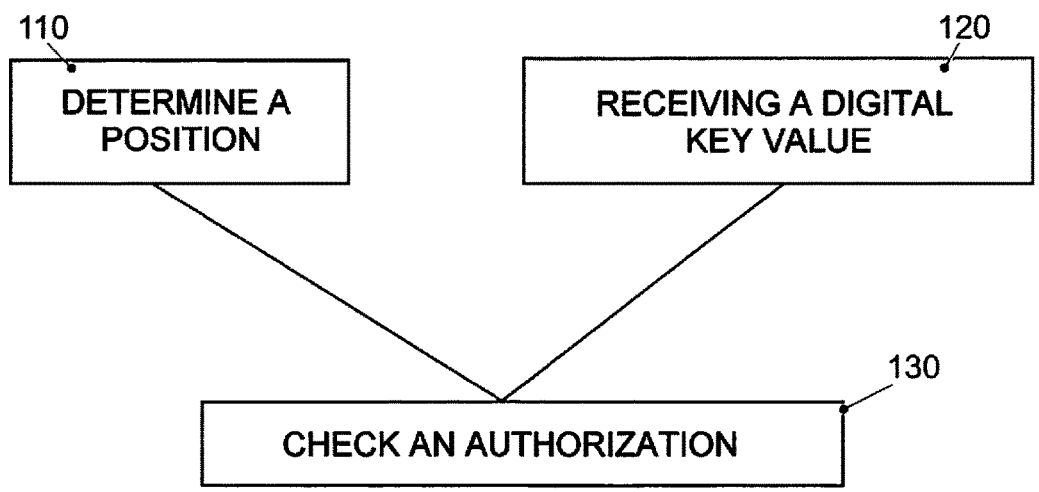
FIG. 1 illustrates a flowchart for an exemplary embodiment of the method for checking an authorization of a mobile communication device.

Security for entry and driving authorization for a vehicle occupies a central position in most cases. Often, a great deal of effort is made to prevent unauthorized entry to a vehicle. The same applies to driving authorization. Vehicle keys often comprise sophisticated security systems to prevent or hamper copying of the keys or entry to the vehicle or mobility of the vehicle without a valid key. These security systems can be based on a transponder, for example, which is activated by a magnetic field of an engine immobilizer system, and which could transmit an electronic entry key to the vehicle.

In addition to conventional entry systems, vehicle keys are being developed that can allow entry to the vehicle without transmission of a key being explicitly activated by a user (what is known as keyless entry) or can allow starting of the vehicle without the vehicle key being inserted into an ignition lock of the vehicle (what is known as keyless starting, also referred to as Keyless Go.

There is the need for an improved design for a security system of a vehicle. Exemplary embodiments provide a method for checking an authorization of a mobile communication device for operating a vehicle engine of a vehicle. The method comprises determining a position of a mobile communication device. The position of the mobile communication device may be inside or outside the vehicle. The method further comprises receiving a digital key value from the mobile communication device. The method further comprises checking the authorization of the mobile communication device for operating the vehicle engine, based on the position of the mobile communication device and based on the digital key value. The authorization for operating the vehicle engine can be granted, by way of example, if the mobile communication device (for example, a programmable mobile phone (smartphone)) is inside the vehicle. This allows the engine of the vehicle to be operated when the owner of the mobile communication device, who may also be the vehicle owner, is inside the vehicle, which can allow increased theft prevention.

By way of example, the determining of the position of the mobile communication device can comprise determining whether the mobile communication device is in a predetermined placement position inside the vehicle. This can simplify determination of the position of the mobile communication device or allow more accurate determination.

In some exemplary embodiments, the determining of the position of the mobile communication device can be based on determining a signal strength of a signal between the mobile communication device and an antenna that is arranged in immediate surroundings of the predetermined placement position. This can allow accurate measurement, since the direct proximity can allow more accurate characterization of transmissions.

In at least one exemplary embodiment, the determining of the position of the mobile communication device can comprise determining a first signal strength of a signal of the mobile communication device via a first antenna and determining a second signal strength of the signal of the mobile communication device via a second antenna. The determining of the position of the mobile communication device can be based on the first signal strength and the second signal strength. This allows a distinction to be drawn, by way of example, as to whether the mobile communication device is inside or outside the vehicle. The first antenna may be an exterior antenna, for example, and the second antenna may be an interior antenna of the vehicle, for example. By way of example, the signal of the mobile communication device can correspond to a communication by the mobile communication device with a different entity than the vehicle, for example, with a base station of a cellular mobile communication network. Alternatively, the signal of the mobile communication device can correspond to a reference signal of the mobile communication device for the first antenna and the second antenna. In some exemplary embodiments, the signal can comprise a carrier frequency of greater than 700 MHz. This allows use of communication systems having a high data transmission rate and having signal properties that can simplify location through increased attenuation.

In some exemplary embodiments, the determining of the position of the mobile communication device can correspond to determining a position of the mobile communication device in or on a wireless charging apparatus of the vehicle. By way of example, it is thus possible for a charging apparatus on hand to allow the determination of the position. By way of example, the determination of the position can be based on a communication between mobile communication device and wireless charging apparatus.

In some exemplary embodiments, the determining of the position of the mobile communication device can further comprise varying a radiation characteristic (for example, a directional characteristic) of an antenna unit (for example, of a group antenna) and capturing information about transmission properties between the antenna unit and the mobile communication device based on the varied radiation characteristic (directional characteristic). By way of example, the radiation characteristic can correspond to a directional characteristic. The determining of the position of the mobile communication device can be based on the captured transmission properties, for example. By way of example, the determining of the position of the mobile communication device can be based on varying the radiation characteristic/directional characteristic of a beamforming beam of the antenna unit (for example, of a phase-controlled group array, or phased array).

By way of example, the determining of the position of the mobile communication device can further comprise varying a further radiation characteristic (directional characteristic) of a further antenna unit and capturing information about further transmission properties between the further antenna unit and the mobile communication device based on the varied further radiation characteristic (directional characteristic). The determining of the position of the mobile communication device can be based on the captured transmission properties and captured further transmission properties. A two-dimensional measurement can improve an accuracy of the identification of the position, for example.

In some exemplary embodiments, the determining of the position of the mobile communication device can further comprise radiating an electromagnetic stimulation signal to a possible position of the mobile communication device, for example, to the predefined placement position. The receiving of the digital key value can be based on the electromagnetic stimulation signal, for example. By way of example, the electromagnetic stimulation signal can be used as a power source for a transceiver of the mobile communication device.

In some exemplary embodiments, the checking of the authorization to operate the vehicle engine can acknowledge an authorization, to start the vehicle engine and/or operate the vehicle engine during the journey, if the determining of the position of the mobile communication device determines a position of the mobile communication device inside the vehicle and the received key value is valid. By way of example, the key value can correspond to a cryptographic key and the method can further comprise checking the cryptographic key.

In some exemplary embodiments, the method can further comprise checking a further authorization of the mobile communication device for unlocking or locking the vehicle, based on the position of the mobile communication device and based on the digital key value. The checking of the authorization for unlocking or locking the vehicle can acknowledge an authorization, to unlock the vehicle and/or lock the vehicle, if the determining of the position of the mobile communication device determines a position of the mobile communication device outside the vehicle (and in proximity to the vehicle, for example), and the received key value is valid.

By way of example, the mobile communication device can correspond to a programmable mobile phone (smartphone, phablet), a tablet computer or a programmable watch (smartwatch). Reception can be based on a BLUETOOTH® Low Energy system, for example. The method can further comprise providing a control signal for the vehicle engine, based on the authorization for operating the vehicle engine.

In some exemplary embodiments, the method can further comprise obtaining information about a biometric authentication (for example, by means of a fingerprint, facial feature analysis or voice analysis) of a user of the mobile communication device. The checking of the authorization of the mobile communication device for operating the vehicle engine can further be based on the information about the biometric authentication. This can further increase security.

Exemplary embodiments further provide a program having a program code for performing the method when the program code is executed on a computer, a processor, a control module or a programmable hardware component.

Exemplary embodiments further provide an apparatus for checking an authorization of a mobile communication device for operating a vehicle engine of a vehicle. The apparatus comprises at least one interface, designed for receiving a digital key value from a mobile communication device. The apparatus further comprises a control module. The control module may be designed for carrying out the method or parts of the method. The control module is designed for determining a position of the mobile communication device. The position of the mobile communication device may be inside or outside the vehicle. The control module is further designed for checking the authorization of the mobile communication device for operating the vehicle engine, based on the position of the mobile communication device and based on the digital key value. The control module is further designed for providing a control signal for the vehicle engine via the at least one interface, based on the authorization for operating the vehicle engine.

The at least one interface can correspond, by way of example, to one or more inputs and/or one or more outputs for receiving and/or transmitting information, for example, in digital bit values, based on a code, within a module, between modules, or between modules of different entities. In exemplary embodiments, the control module can correspond to any controller or processor or to a programmable hardware component. By way of example, the control module may also be realized as software that is programmed for a corresponding hardware component. In this respect, the control module may be implemented as programmable hardware with appropriately adapted software. It is possible for any processors, such as digital signal processors (DSPs), to be used in this case. Exemplary embodiments are not limited to one particular type of processor in this case. Any processors or even multiple processors are conceivable for implementing the control module.

In some exemplary embodiments, the apparatus can further comprise a wireless/cordless charging apparatus, or the at least one interface may be designed for communication with the wireless charging apparatus. By way of example, the apparatus can comprise the first antenna and/or the second antenna, or the at least one interface may be designed to communicate with or via the first and/or second antenna. By way of example, the apparatus can comprise one or more BLTE transceivers. By way of example, the apparatus can comprise the antenna unit and/or the further antenna unit, or the at least one interface may be designed to communicate with or via the antenna unit and/or the further antenna unit. By way of example, the apparatus can comprise an electromagnetic emitter for radiating the electromagnetic stimulation signal. Exemplary embodiments further provide the vehicle, comprising the apparatus for checking the authorization of the mobile communication device.

Various exemplary embodiments are now described in more detail with reference to the accompanying drawings, in which some exemplary embodiments are depicted. In the figures, the thickness dimensions of lines, layers and/or regions may be depicted in an exaggerated manner for the sake of clarity.

In the subsequent description of the appended figures, which show only some exemplary embodiments by way of example, like reference symbols can denote like or comparable components. Further, combinatory reference symbols can be used for components and objects that occur repeatedly in an exemplary embodiment or in a drawing, but are described jointly with regard to one or more features. Components or objects that are described using like or combinatory reference symbols can be embodied identically, but possibly also differently, in respect of single, multiple or all features, for example, their dimensions, unless the description explicitly or implicitly reveals otherwise.

Although exemplary embodiments may be modified and amended in various ways, exemplary embodiments are depicted as examples in the figures and are described thoroughly herein. It should be clarified, however, that there is no intention to restrict exemplary embodiments to the forms respectively disclosed, rather that exemplary embodiments are intended to cover all functional and/or structural modifications, equivalents and alternatives that lie within the scope of the disclosure. Like reference symbols denote like or similar elements throughout the description of the figures.

It should be noted that one element denoted as "connected" or "coupled" to another element may be directly connected or coupled to the other element, or that intervening elements may be present. By contrast, if one element is denoted as "directly connected" or "directly coupled" to another element, then no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves merely to describe specific exemplary embodiments and is not intended to restrict the exemplary embodiments. As used herein, the singular forms "a", "an" and "the" are also intended to include the plural forms, as long as the context does not explicitly indicate something else. Furthermore, it should be clarified that the expressions such as, e.g., "includes", "including", "has", "comprises", "comprising" and/or "having", as used herein, indicate the presence of stated features, integers, operations, work sequences, elements and/or components, but do not exclude the presence or the addition of one or one or more features, integers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they have the meaning that is consistent with their meaning in the context of the relevant art, and should not be interpreted in an idealized or excessively formal sense, as long as this is not expressly defined herein.

FIG. 1 illustrates a flowchart for an exemplary embodiment of a method for checking an authorization of a mobile communication device for operating a vehicle engine of a vehicle 100. The method comprises determining 110 a position of a mobile communication device. The position of the mobile communication device 200 may be inside or outside the vehicle 100. The method further comprises receiving 120 a digital key value. The method further comprises checking 130 the authorization of the mobile communication device 200 for operating the vehicle engine, based on the position of the mobile communication device 200 and based on the digital key value.

Figure 2:
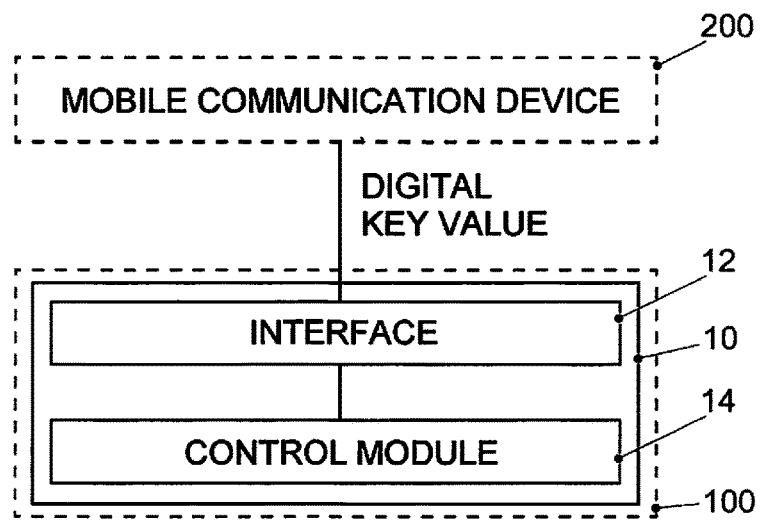
FIG. 2 illustrates a block diagram of an exemplary embodiment of an apparatus for checking an authorization of a mobile communication device.

FIG. 2 illustrates a block diagram of an exemplary embodiment of a corresponding apparatus for checking an authorization of a mobile communication device for operating a vehicle engine of a vehicle 100. The apparatus comprises at least one interface 12, designed for communication with a mobile communication device 200, and a control module 14, designed for carrying out the method. The control module is designed for determining the position of the mobile communication device 200, for example. The position of the mobile communication device 200 may be inside or outside the vehicle 100. The control module is further designed for checking the authorization of the mobile communication device 200 for operating the vehicle engine, based on the position of the mobile communication device 200 and based on the digital key value. The control module is further designed for providing a control signal for the vehicle engine via the at least one interface 12, based on the authorization for operating the vehicle engine.

The description below relates at least to the method of FIG. 1 and the apparatus of FIG. 2.

By way of example, the authorization for operating the vehicle engine can correspond to an authorization for starting the vehicle engine and/or an authorization for operating the vehicle engine during the journey, for example, in a KeylessGo environment (keyless starting).

In at least some exemplary embodiments, the determining 110 of the position of the mobile communication device can comprise determining whether the mobile communication device is in a predetermined placement position inside the vehicle 100. By way of example, the predetermined placement position can correspond to a region of the vehicle, for example, the front row of seats, the driver's seat, the central console or a tray between the driver's and passenger's seats. By way of example, the predetermined placement position can correspond to a functional placement position, for example, a dock for the mobile communication device 200, a (wireless/cordless) charger for the mobile communication device or an interface of an entertainment media system of the vehicle for the mobile communication device.

By way of example, the determining 110 of the position of the mobile communication device can determine whether the mobile communication device 200 is inside or outside the vehicle.

In at least some exemplary embodiments, the determining 110 of the position of the mobile communication device can comprise determining a first signal strength of a signal of the mobile communication device via a first antenna and determining a second signal strength of the signal of the mobile communication device via a second antenna. By way of example, the determining of the position of the mobile communication device can be based on the first signal strength and the second signal strength. By way of example, the apparatus 10 can comprise the first antenna and/or the second antenna, or the at least one interface 12 may be designed to communicate with or via the first and/or second antenna.

By way of example, the signal of the mobile communication device 200 can correspond to a reference signal of the mobile communication device 200 for the first antenna and the second antenna. By way of example, the reference signal can comprise a predefined signal level and/or transmission power. By way of example, the (reference) signal can correspond to an omnidirectional signal (a nondirectional signal) or a directional signal (for example, a beamforming signal). By way of example, the signal of the mobile communication device 200 can correspond to a communication via the mobile communication device with a different entity than the vehicle (100). By way of example, the signal can correspond to a (nondirectional) signal between the mobile communication device and a base station of a cellular mobile radio system. The method can determine, for example, based on a signal strength, received via the first and second antennas, of the signal between the mobile communication device and the base station, the position of the mobile communication device, for example, whether the mobile communication device is inside or outside the vehicle. By way of example, the signal can comprise a carrier frequency of greater than 700 MHz (or greater than 800 MHz, greater than 1 GHz, greater than 1.5 GHz, greater than 1.8 GHz, greater than 2 GHz, greater than 2.5 GHz, greater than 3 GHz, greater than 5 GHz).

By way of example, the signal of the mobile communication device 200 can be based on a BLUETOOTH® protocol, for example, a BLUETOOTH® Low Energy protocol. The signal of the mobile communication device 200 can be transmitted after a connection setup by the mobile communication device 200 to the vehicle, for example, or before the connection setup. By way of example, the mobile communication device 200 may be designed to make the connection to the vehicle and, after the connection setup, to receive the signal both via the first antenna and via the second antenna. The determining of the first and second signal strengths of the signal can be performed after a connection setup, by the mobile communication device to the vehicle/the apparatus 10, for example. In some exemplary embodiments, the method can further comprise setup of a connection (for example, via a BLUETOOTH® protocol context) between vehicle (apparatus 10) and mobile communication device 200. By way of example, the same signal or a similar signal can be sent repeatedly by the mobile communication device 200 and received first via the first antenna and then via the second antenna (or vice versa) for the purpose of determining the position. By way of example, the signal of the mobile communication device 200 can correspond to a discovery or advertising signal of a BLUETOOTH® protocol. By way of example, the method can further comprise requesting the signal from the mobile communication device, for example, based on a hardware address (BLUETOOTH® address) of the mobile communication device. The requesting of the signal can be provided to the mobile communication device by the apparatus 10 or a signal station (also referred to as a beacon), for example.

By way of example, the first antenna may be an exterior antenna and wherein the second antenna may be an interior antenna of the vehicle 100. By way of example, the interior antenna may be arranged in surroundings of the predetermined placement position. By way of example, the interior antenna can have an antenna characteristic that picks up signals from the predetermined placement position. By way of example, the first antenna and the second antenna may with the same transceiver module, and the determining 110 of the position can comprise changing over the transceiver module between the first antenna and the second antenna for the purpose of determining the position of the mobile communication device. The apparatus 10 can comprise the transceiver module. Alternatively, the first antenna may be connected to a first transceiver module and the second antenna may be connected to a second transceiver module. The determining of the position of the mobile communication device can be based, by way of example, on a first measured signal strength of the mobile communication device via the first antenna and the first transceiver module and on a second measured signal strength of the mobile communication device via the second antenna and the second transceiver module.

By way of example, the determining 110 of the position can determine a position of the mobile communication device 200 inside the vehicle if the second signal strength is at least 10% greater (or at least 20% greater, at least 30% greater, at least 50% greater, at least 75% greater, at least 100% greater) than the first signal strength. By way of example, the determining 110 of the position can determine a position of the mobile communication device 200 outside the vehicle if the first signal strength is at least 10% greater (or at least 20% greater, at least 30% greater, at least 50% greater, at least 75% greater, at least 100% greater) than the second signal strength.

By way of example, the signal can correspond to a reference signal having a known signal strength. By way of example, the determining 110 of the position can determine a position of the mobile communication device 200 inside the vehicle if the second signal strength is above a first threshold value. By way of example, the determining 110 of the position can determine a position of the mobile communication device 200 inside the vehicle if the second signal strength is above a first threshold value and wherein the first signal strength is below a second threshold value. The first threshold value may be more than 20% (or more than 50%, more than 100%) greater than the second threshold value, for example. By way of example, the determining 110 of the position can determine a position of the mobile communication device 200 outside the vehicle if the first signal strength is above a third threshold value. By way of example, the determining 110 of the position can determine a position of the mobile communication device 200 outside the vehicle if the first signal strength is above a third threshold value and wherein the second signal strength is below a fourth threshold value. The third threshold value may be more than 20% (or more than 50%, more than 100%) greater than the fourth threshold value, for example. By way of example, the determining 110 of the position can determine a position of the mobile communication device 200 outside the vehicle if the second signal strength is above an outside threshold value, wherein the signal can correspond to a reference signal having a known signal strength, for example.

In some exemplary embodiments, the determining of the position 110 can further be based on whether at least one window of the vehicle is open. By way of example, the first and/or third threshold value may be higher if at least one window of the vehicle is open. By way of example, the second and/or fourth threshold value may be lower if at least one window is open. By way of example, a required (absolute or percentage) difference between the first signal strength and the second signal strength for determining the position may be higher if at least one window of the vehicle is open.

The signal strength can correspond, by way of example, to a transmission power of the mobile communication device that is received by the first/second antenna. The signal strength can comprise, by way of example, at least one element from the group comprising received signal power, received signal level, received signal quality and transfer function or attenuation of a transmission signal of the mobile communication device.

In at least some exemplary embodiments, the determining 110 of the position of the mobile communication device 200 can be based on determining a signal strength of a signal between the mobile communication device 200 and an antenna that is arranged in immediate surroundings of the predetermined placement position. By way of example, the determining 110 of the position can comprise measuring the signal strength of the signal, By way of example, the signal can be provided by the mobile communication device 200.

Alternatively, the signal can be provided by the antenna. The mobile communication device 200 may be designed to measure the signal strength of the signal, and to provide information about the measured signal strength to the vehicle (the apparatus 10). The information about the measured signal strength can comprise, by way of example, a value for the measured signal strength, measured raw measurement data about the signal strength or information about the signal strength being greater than a threshold value. The determining 110 of the position of the mobile communication device 200 can be based on the information about the measured signal strength or on the measured signal strength.

The antenna may be arranged below the predetermined placement position, for example. By way of example, the antenna may be integrated in a placement area for the predetermined placement position. In at least some exemplary embodiments, the antenna may be arranged less than 30 cm (or less than 25 cm, less than 20 cm, less than 15 cm, less than 10 cm, less than 5 cm, less than 2 cm) from the predetermined placement position. If the predetermined placement position corresponds to a horizontal indentation (for example, a compartment) in the central console, then the antenna may be integrated in an upper surface of the indentation or may be arranged above the indentation, for example. By way of example, the antenna may be designed to receive signals only from one direction, which faces the predetermined placement position, and a line of sight between antenna and predetermined placement position may be unperturbed at least 80% of the time during operation of the vehicle.

The signal can be based on a communication between the mobile communication device and the vehicle (the apparatus 10), for example, or the communication can comprise the signal. By way of example, the signal can be based on a BLUETOOTH® communication between the mobile communication device and the vehicle (the apparatus 10), or the BLUETOOTH® communication can comprise the signal. By way of example, the BLUETOOTH® communication can comprise at least one element from the group comprising BLUETOOTH® advertising packet (advertisement of a device), BLUETOOTH® coupling process, BLUETOOTH® Keep Alive Packet (packets to maintain the connection, for example, dummy protocol data units (PDU) and BLUETOOTH® data transmission.

The determining 110 of the position can determine the position of the mobile communication device 200 inside the vehicle if the signal strength of the signal is above a threshold value. The determining 110 of the position can determine the position of the mobile communication device 200 inside the vehicle if an adjusted value or mean value from multiple measurements of the signal strength of the signal (for example, within a predefined interval of time) is above a threshold value. By way of example, the adjusting may be based on an averaging or smoothing algorithm. By way of example, the threshold value may be stipulated based on at least one element from the group comprising the antenna, the mobile communication device, the predetermined placement position and the vehicle. By way of example, the threshold value may be based on a device model or device type of the mobile communication device. By way of example, the determining of the position may be based on various threshold values for various mobile communication devices. The threshold value can correspond to a decibel value, for example.

In some exemplary embodiments, the method can further comprise adapting or determining the threshold value. By way of example, the adapting or determining of the threshold value can further comprise determining the threshold value based on the mobile communication device. By way of example, the mobile communication device can be placed on the predetermined placement position for a calibration process, and the threshold value can be determined based on a measured signal strength during the calibration process. By way of example, the threshold value may be less than 100% (or less than 80%, less than 50%, less than 30%, less than 20%, less than 10%) greater than the measured signal strength. In some exemplary embodiments, the adapting of the threshold value may be based on a previous threshold value, or the adapting of the threshold value may be based on no previous threshold value or on an estimated value. By way of example, the adapting of the threshold value can comprise readjusting the threshold value. By way of example, the readjusting may be based on a mean, an adjusted mean or an average value of previously measured signal strengths for the signal. By way of example, the readjusting may be based on a moving mean value/average value of previously measured signal strengths. By way of example, the readjusting can be performed without user interaction.

In some exemplary embodiments, the determining 110 of the position of the mobile communication device 200 can correspond to determining a position of the mobile communication 200 in or on a wireless charging apparatus of the vehicle 100. By way of example, the determining 110 of the position can comprise to receiving an identification of the mobile communication device via the wireless charging apparatus, for example, based on a communication by the mobile communication device with the wireless charging apparatus. By way of example, the identification of the mobile communication device can to an explicit identification number of the mobile communication device vis-à-vis the wireless charging apparatus, to a specific charging behavior of the mobile communication device through the wireless charging apparatus and/or a communication by the mobile communication device, initiated by the wireless charging apparatus, via a further communication channel, for example, with a transceiver module of the vehicle via a wireless local area network or a short-range radio link (for example, via BLUETOOTH® or near field communication). In some exemplary embodiments, the apparatus can further comprise a wireless/cordless charging apparatus, or the at least one interface may be designed for communication with the wireless charging apparatus.

By way of example, the determining 110 of the position of the mobile communication device 200 can further comprise varying a radiation characteristic (for example, a directional characteristic) of an antenna unit and capturing information about transmission properties between the antenna unit and the mobile communication device 200 based on the varied radiation characteristic (directional characteristic). The determining 110 of the position of the mobile communication device 200 may be based on the captured transmission properties. By way of example, the varying of the radiation characteristic (directional characteristic) can base varying of the radiation characteristic based a plurality of possible radiation characteristics (directional characteristics) or based on a plurality of radiation characteristics (directional characteristics) in the direction of the predetermined placement position. By way of example, the determining 110 can comprise emitting a reference signal for every radiation characteristic (directional characteristic), and obtaining feedback from the mobile communication device 200 about a signal strength of the reference signal for the respective radiation characteristic (directional characteristic). By way of example, the determining 110 of the position of the mobile communication device may be based on a comparison of the signal strengths of the reference signal for the respective radiation characteristic (directional characteristic). By way of example, a position of the mobile communication device 200 on or in the predetermined placement position can be determined if a signal strength for a radiation characteristic (directional characteristic) that is associated with the predetermined placement position is stronger than the signal strengths of other radiation characteristics (directional characteristics) (for example, more than 10% stronger, more than 20%, or more than 50% stronger than the signal strengths of the other radiation characteristics/directional characteristics), or if the signal strength that is associated with the predetermined placement position is above a threshold value.

In some exemplary embodiments, the determining 110 of the position of the mobile communication device 200 can further comprise varying a further radiation characteristic (directional characteristic) of a further antenna unit and capturing information about further transmission properties between the further antenna unit and the mobile communication device 200 based on the varied further radiation characteristic (directional characteristic). The determining 110 of the position of the mobile communication device 200 may be based on the captured transmission properties and captured further transmission properties. By way of example, a mean of the varied radiation characteristic (directional characteristic) and a mean of the varied further radiation characteristic (directional characteristic) may be essentially orthogonal to one another. By way of example, the determining 110 can determine the position of the mobile communication device based on the captured transmission properties on an axis along a radiation characteristic (directional characteristic) for which the transmission properties are vis-à-vis other radiation characteristics (directional characteristics), and, based on the captured further transmission properties, can determine the position of the mobile communication device on a further axis along a further radiation characteristic (directional characteristic) for which the further transmission properties are vis-à-vis other radiation characteristics (directional characteristic). The determining 110 can determine the position of the mobile communication device based on a point of intersection between the axis and the further axis.

By way of example, the apparatus 10 can comprise the antenna unit and/or the further antenna unit, or the at least one interface 12 may be designed to communicate with or via the antenna unit and/or the further antenna unit.

In some exemplary embodiments, the determining 110 of the position of the mobile communication device 200 can further comprise radiating an electromagnetic stimulation signal to a possible position of the mobile communication device 200. The receiving 120 of the digital key value may be based on the electromagnetic stimulation signal, for example. The electromagnetic stimulation signal may be designed, by way of example, to initiate the mobile communication device's providing of the digital key value. By way of example, the electromagnetic stimulation signal may be designed to supply a transmission unit of the mobile communication device with power. Alternatively, the electromagnetic stimulation signal may merely be designed to provide a request for the digital key value to the mobile communication device. By way of example, the electromagnetic stimulation signal can be radiated such that it is attenuated by a passenger compartment of the vehicle such that a signal strength of the electromagnetic stimulation signal outside the vehicle is below a threshold value below which the mobile communication device is designed to provide the key value. By way of example, the possible position of the mobile communication device can correspond to the predetermined placement position. By way of example, the apparatus 10 can comprise an electromagnetic emitter for radiating the electromagnetic stimulation signal. The electromagnetic stimulation signal may be based on a radiofrequency identification (RFID) method, for example.

By way of example, the digital key value can comprise an identification of an (authorized) user of the vehicle. By way of example, the digital key value may be based on a cryptographic method. By way of example, the digital key value may be encrypted or signed with a cryptographic key or with a key certificate or a key certificate chain. By way of example, the digital key value may further be based or signed with a key or certificate of the vehicle 100. By way of example, the digital key value may be based on a key interchange between vehicle and mobile communication device, for example, based on a Diffie Hellman method. By way of example, a communication between vehicle/at least one interface 12 and mobile communication device 200 may be protected by a transport encryption. By way of example, the transport encryption may further be based on a key interchange. By way of example, the receiver 120 may be based on a short range radio system, for example, on a BLUETOOTH® Low Energy (BTLE) system, on a BLUETOOTH® system, a near field communication (NFC) system or a wireless local area network (WLAN). By way of example, the apparatus can comprise one or more BTLE transceivers. By way of example, the apparatus can comprise one or more NFC transceivers, one or more BLUETOOTH® receivers and/or one or more WLAN transceivers.

In some exemplary embodiments, the determining 110 of the position can be performed before the receiving 120 of the digital key value. Alternatively, the determining 110 of the position can be performed at the same time as the receiving 120 of the digital key value, for example, as a result of measurement of a communication link between mobile communication device and apparatus 10/vehicle 100. Alternatively, the determining 110 of the position can be performed after the receiving 120 of the digital key value.

By way of example, the checking 130 of the authorization to operate the vehicle engine can check whether the digital key value is valid and whether the operating of the vehicle engine (or carrying-out of a further vehicle function) is permitted at the determined position of the mobile communication device (for example, inside or outside the vehicle). By way of example, the checking 130 can determine the validity of the digital key value by decrypting or verifying the digital key value based on a key certificate, based on a key certificate chain and/or based on a certificate or key of the vehicle.

By way of example, the checking 130 of the authorization to operate the vehicle engine can acknowledge an authorization, to start the vehicle engine and/or operate the vehicle engine during the journey, if the determining 110 of the position of the mobile communication device 200 determines the position of the mobile communication device 200 inside the vehicle 100 (for example, in or on the predetermined placement position) and the received key value is valid.

By way of example, the determining 110 of the position of the mobile communication device 200, the receiving of the digital key value 120 and/or the checking 130 of the authorization for operating the vehicle engine can be initiated before or after operation of a start function of the vehicle. Alternatively or additionally, the determining 110 of the position of the mobile communication device 200, the receiving of the digital key value 120 and/or the checking 130 of the authorization for operating the vehicle engine be performed periodically, for example, during a journey by the vehicle.

In at least some exemplary embodiments, the method can further comprise providing a control signal for the vehicle engine, based on the authorization for operating the vehicle engine. By way of example, the control signal may be designed to allow the vehicle engine to be started or can permit or prevent operation of the vehicle engine he. By way of example, the control signal may be designed to activate or deactivate a register or a variable in an engine controller or in a central vehicle controller that allows operation of the vehicle engine.

In some exemplary embodiments, the method can further comprise checking a further authorization of the mobile communication device 200 for unlocking or locking the vehicle 100, based on the position of the mobile communication device 200 and based on the digital key value. The checking of the further authorization may be implemented in a manner similar to the checking of the authorization 130. By way of example, the checking of the further authorization for unlocking or locking the vehicle 100 can acknowledge an authorization, to unlock the vehicle 100 and/or lock the vehicle 100, if the determining 110 of the position of the mobile communication device 200 determines a position of the mobile communication device 200 outside the vehicle 100 in proximity to the vehicle 100 and the received key value is valid. By way of example, the checking of the further authorization can acknowledge the authorization for unlocking if the determining of the position of the mobile communication device determines the mobile communication device to be less than 20 m (or less than 15 m, less than 10 m, less than 5 m, less than 3 m, less than 2 m, less than 1 m) away from the automobile. By way of example, the checking 130 can unlock the vehicle automatically or at the request (for example, push of a key or voice command) of a user of the mobile communication device if the determining of the position of the mobile communication device determines the mobile communication device to be less than 20 m (or less than 15 m, less than 10 m, less than 5 m, less than 3 m, less than 2 m, less than 1 m) away from the vehicle and the determining 110 of the position of the mobile communication device determines that the mobile communication device is drawing nearer to the vehicle.

By way of example, the method can further comprise checking a further authorization of the mobile communication device 200 for opening a barrier or door based on the position of the mobile communication device and based on the digital key value. The checking of the further authorization may be implemented in a manner similar to the checking of the authorization 130. By way of example, the checking of the further authorization for opening a barrier or door can acknowledge an authorization if the determining 110 of the position of the mobile communication device 200 determines a position of the mobile communication device 100 in proximity to the door/barrier and the received key value is valid. By way of example, the checking of the further authorization can acknowledge the authorization for unlocking if the determining of the position of the mobile communication device determines the mobile communication device to be less than 20 m (or less than 15 m, less than 10 m, less than 5 m, less than 3 m, less than 2 m, less than 1 m) away from the door/barrier. Analogously, the checking of the further authorization can be used where, besides the successful authentication, it is also necessary to set up a reference to the position of the key/mobile device.

By way of example, the checking 130 can lock the vehicle automatically or at the request of the user if the determining of the position of the mobile communication device determines the mobile communication device to be more than 1 m (or more than 2 m, more than 3 m, more than 5 m, more than 10 m, more than 20 m) away from the vehicle and the determining 110 of the position of the mobile communication device determines that the mobile communication device is moving away from the vehicle.

The mobile communication device 200 can correspond, by way of example, to a programmable mobile phone (also referred to as a smartphone) or a programmable watch (also referred to as a smartwatch). Alternatively, the mobile communication device can correspond to a further communication device wearable on the body (also referred to as a wearable communication device), for example, a networked fitness tracker or a pair of augmented reality spectacles (spectacles for displaying information that is integrated into a depiction of the surroundings). By way of example, a user of the mobile communication device may have authenticated himself on the mobile communication device at least once, for example, via a biometric authentication (for example, via fingerprint, iris scan, voice recognition and/or recognition of facial features) or via an input password or pin code.

By way of example, the method can further comprise obtaining information about biometric authentication of a user of the mobile communication device 200. The biometric authentication can be based, by way of example, on unlocking the mobile communication device 200 for the purpose of using the communication device or on biometric authentication for the purpose of obtaining authorization for operating the vehicle engine, for example, a mobile application (also referred as an app) of a manufacturer or operator of the vehicle. The checking 130 of the authorization of the mobile communication device 200 for operating the vehicle engine (and/or the checking of the further authorization) may further be based on the information about the biometric authentication. By way of example, the information about the biometric authentication can comprise raw data from a sensor that is designed to pick up biometric data for the authentication. Alternatively, the information about the biometric authentication can comprise a processed value (for example, a hash value) about the captured biometric data, or a piece of information about successful biometric authentication of the user. By way of example, the information about the biometric authentication can be transmitted in encrypted form.

By way of example, the vehicle engine can correspond to an internal combustion engine, an electric motor, a fuel cell engine, a liquid gas engine or hybrid engine module.

In at least some exemplary embodiments, the vehicle 100 can correspond to a land vehicle, a watercraft, an aircraft, a rail vehicle, a road vehicle, an automobile, an all-terrain vehicle, a motor vehicle or a truck, for example.

At least some exemplary embodiments allow location of a mobile radio in a tray for the purpose of verifying a digital key secret. Exemplary embodiments allow use of a mobile phone as a digital key, for example: to start the engine, it is possible to explicitly identify that the "key" is in the vehicle. To be able to open the vehicle using the same key even from some distance, BLUETOOTH® LE (Low Energy) technology is used, for example. Some systems can use near field communication (NFC) for example. NFC technology is not present in every mobile phone. Furthermore, NFC usually works only over a very short distance.

Some exemplary embodiments may be based on changing over between two antennas to establish whether the mobile phone (something a mobile communication device 200) is on the tray or at least in proximity to the tray. At least some exemplary embodiments allow universal use of the mobile phone as a key for starting and opening from a distance.

At least some exemplary embodiments are based on location of a digital key (for example, of the mobile communication device 200) by changing over at least two antennas. This can allow identification of a BLUETOOTH® LE device in a tray or the immediate surroundings thereof, for example.

Figure 3A:
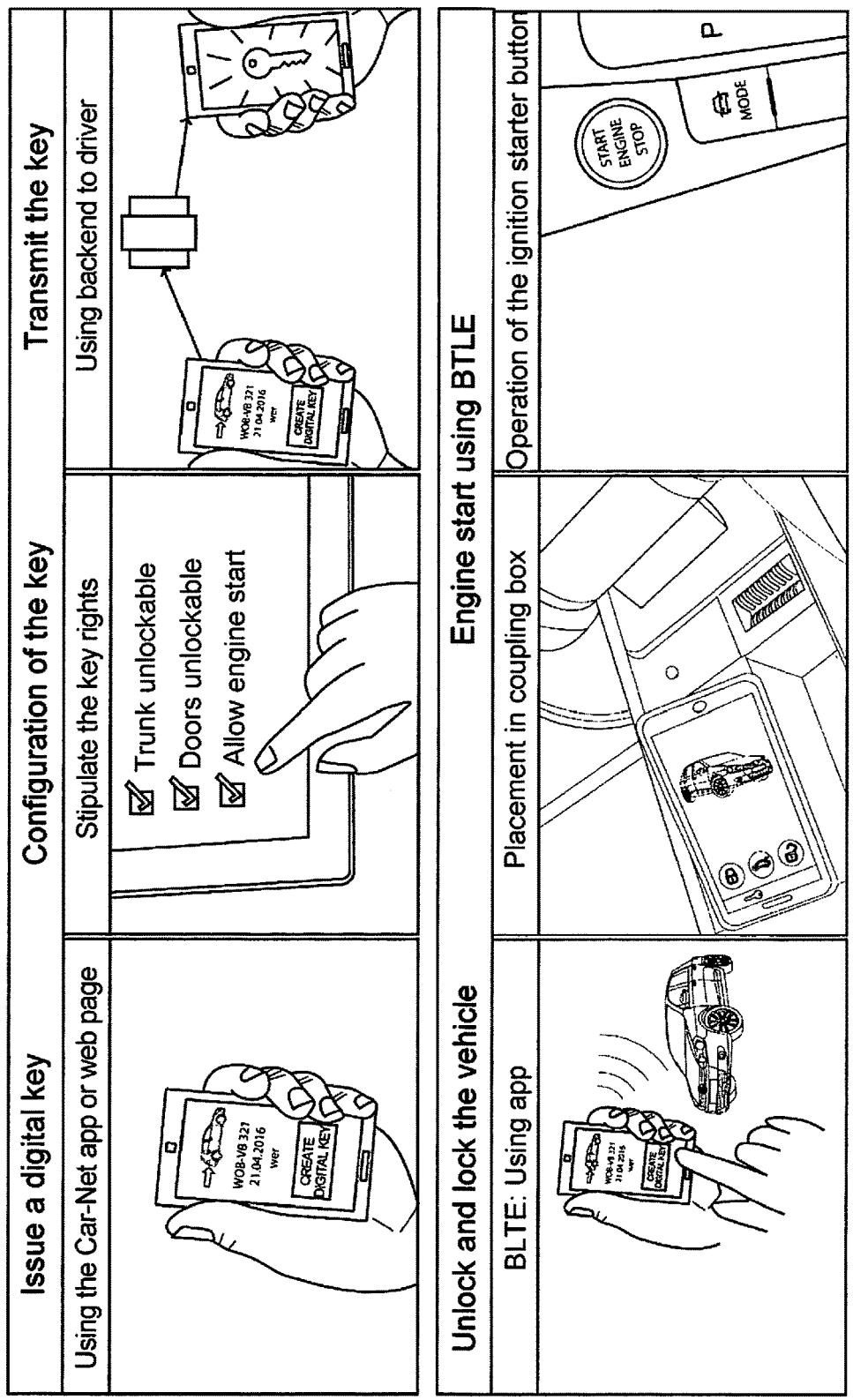
FIGS. 3a-3d show exemplary embodiments by way of example.

For future vehicle generations, it is desirable to transmit a key secret (for example, a digital key value) to a mobile communication device (e.g., smartphone) (FIG. 3a). This device is subsequently also called a digital key. By way of example, various key rights can be acknowledged in this case (for example, unlock trunk, unlock doors, engine start). The key rights can be transmitted (in the digital key value) via a server of the vehicle manufacturer to the mobile communication device, for example. The checking of the authorization (or of the further authorization) may be based on the key rights, for example.

This checking can allow the customer to open the vehicle from a certain distance, for example, via a mobile application (also referred to as an app) (in this case, NFC technology is at a disadvantage, since it only works over very short distances). Furthermore, the vehicle could be started if the digital key is in a vehicle with certainty.

On account of interference in the vehicle—caused by reflections from metal walls—it may be necessary for the digital key to be close to the antenna in comparison with reflecting walls to avoid undesirable effects as a result of cancellations. This can necessitate a predetermined placement position inside the vehicle.

Figure 3B:
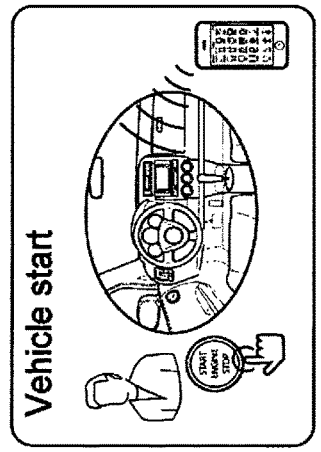
Figure 3B:
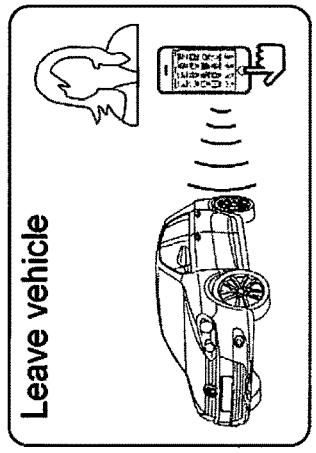
Figure 3B:
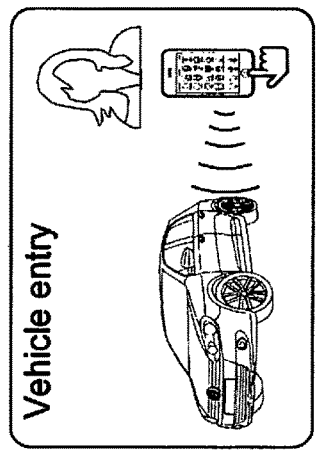
Figure 3B:
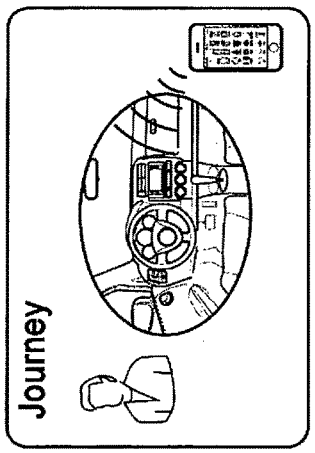
Figure 3B:
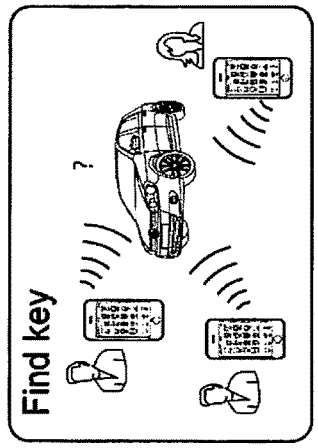

It is possible, as shown in FIG. 3b, for there to be the following scenarios, for example (possible exemplary embodiment in brackets):
find key (antenna switched to exterior)
vehicle entry (periodic changeover between interior and exterior antennas)
vehicle start (periodic changeover between interior and exterior antennas)
journey (periodic changeover between interior and exterior antennas)
leave/lock vehicle (periodic changeover between interior and exterior antennas)

Scenarios 2 to 5 can require local determination of the digital key (outside the vehicle, or in or in proximity to the tray).

Figure 3C:
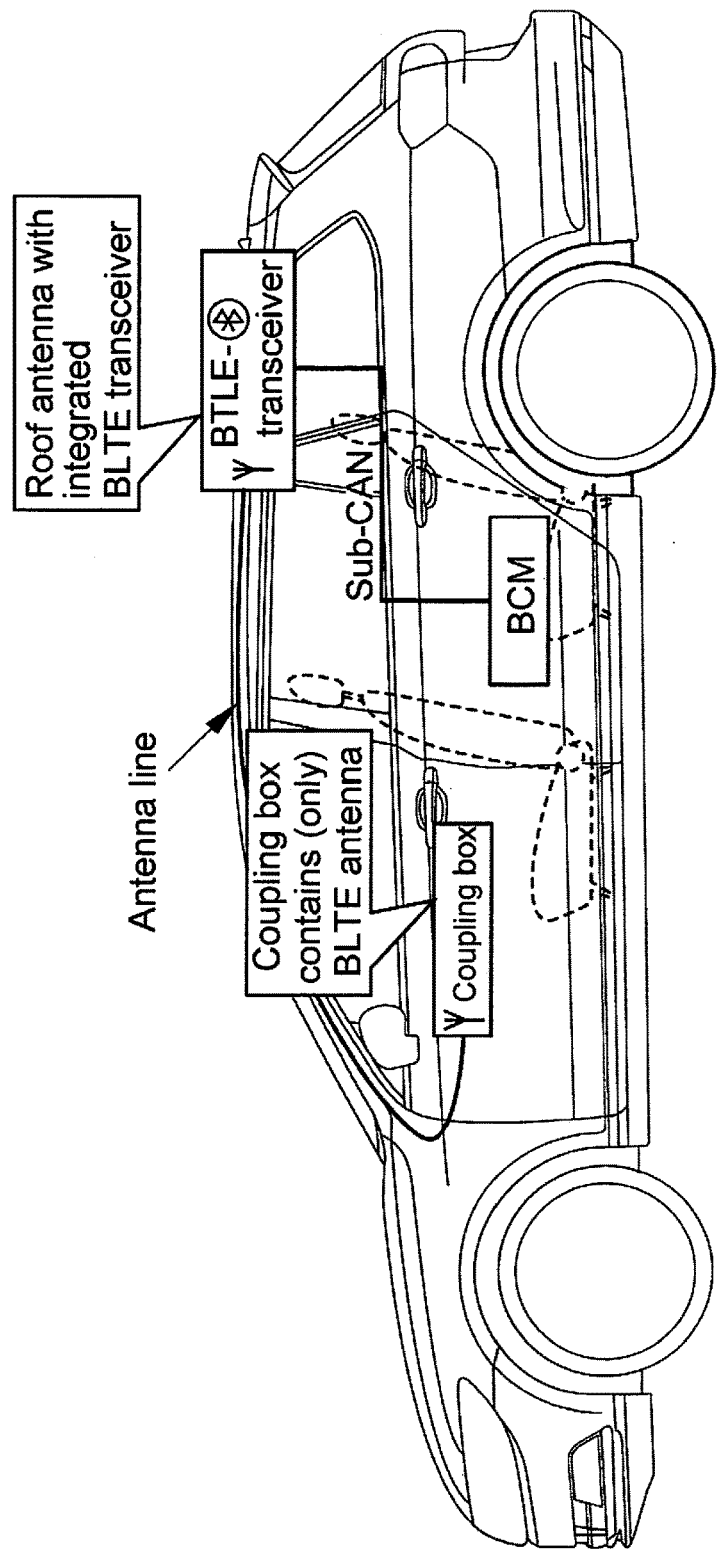
Figure 3D:
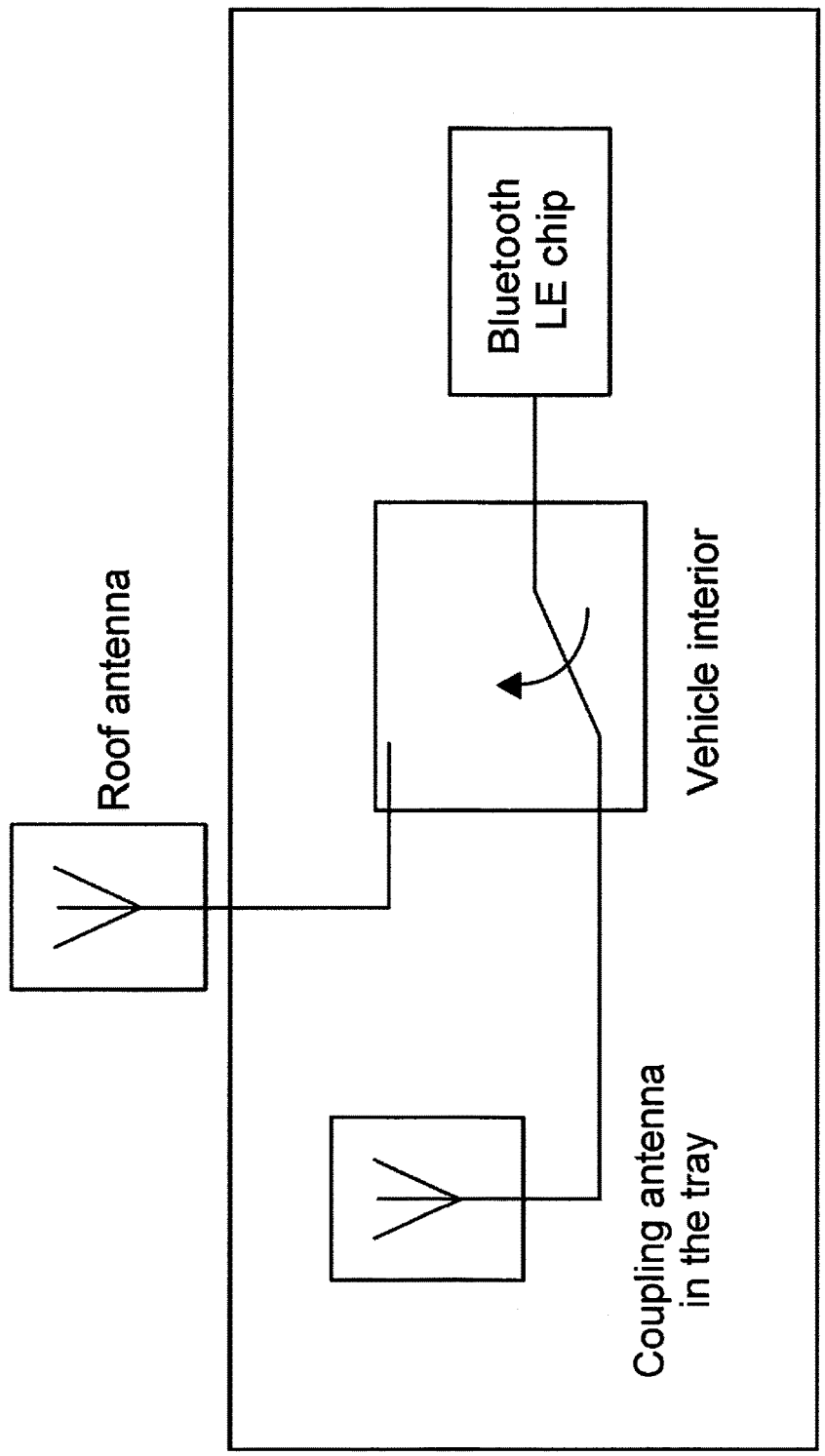

FIG. 3c shows a schematic depiction of an antenna configuration. A vehicle comprises a first antenna module (exterior antenna) and a second antenna module (interior antenna). The first antenna module can, in some exemplary embodiments, comprise a transceiver, for example, a BTLE (BLUETOOTH® Low Energy) transceiver, and the second antenna module may in some cases comprise only one antenna and be coupled to the transceiver of the first antenna module. FIG. 3d shows a schematic depiction. By way of example, the exterior antenna and the interior antenna may be coupled to the same BTLE transceiver.

One possible method for determining the position of the mobile communication device can comprise, by way of example:

1. measurement of the RSSI (Received Signal Strength Indicator, signal reception power) at the first antenna
2. changeover to the second antenna
3. measurement of the RSSI at the second antenna
4. evaluation of the RSSI values (absolute values and relative values)
5. determination of the position: outside vehicle, in the tray
   association of the RSSI values to
   BLUETOOTH® address
   o Antenna (switch position)
   Packet-accurate changeover
   Sufficiently accurate RSSI On the basis of a certain accuracy, there may be a "grey zone" in which it is not possible to accurately determine whether the digital key is inside or outside the vehicle. This may be the case, by way of example, when the digital key is far away from the antenna in the tray, but is still in the vehicle. In this case, it seems as though the key were outside. Therefore, the position inside the vehicle can be guaranteed by the position in the tray.

At least some exemplary embodiments can allow interior identification of a mobile device by signal strength measurement for the purpose of starting a vehicle in accordance with applicable admission regulations and insurance requirements, for example.

So that a vehicle can be started, the vehicle key may at least in some cases be necessarily in the vehicle interior at the time of the engine start attempt. This may be imperative as a result of an admission prerequisite (for example, based on FMVSS 114, a Federal Motor Vehicle Safety Standard) or as a result of an insurance requirement (for example, according to Thatcham), for example. In the case of other vehicle keys, the vehicle may know, following insertion and turning of the key, that the lock bit fits in the lock and the key can be locked. This can ensure that, when the engine starts, the key cannot be removed again and is in the vehicle interior during the starting process and during the journey. In the case of Kessy (Keyless Entry/Exit Start System) keys, there may be an electronic terminal controller; LF (low-frequency) antennas can be used to check whether the Kessy key is in the vehicle interior when the start button is operated. For further use of mobile devices (e.g., smartphones) as vehicle keys, this interior identification of the "key" can be accomplished using the radio technologies installed in the mobile device, for example.

Figure 4:
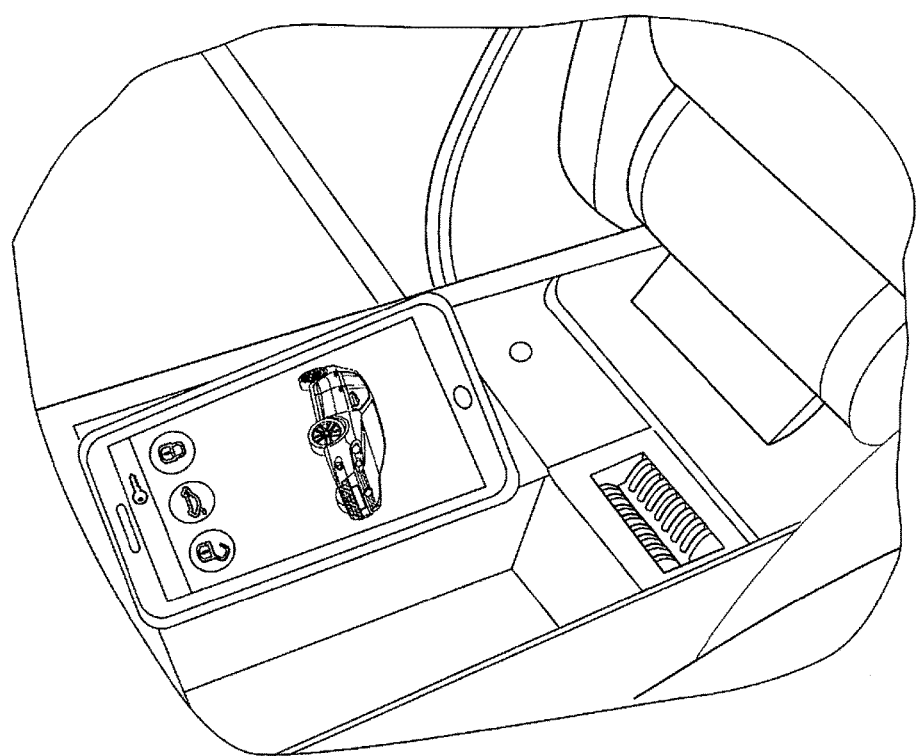
FIG. 4 shows an exemplary placement of the mobile communication device at a predefined placement position on the central console of a vehicle.

The mobile device can be placed on a firmly defined (predefined) placement position (e.g., in the central console of the vehicle), for example. FIG. 4 shows an exemplary placement of the mobile communication device at a predefined placement position on the central console of a vehicle. Directly beneath this placement position, a BLUETOOTH® Low Energy or BLUETOOTH® Classic Antenna may installed, for example (the antenna can correspond to a BLUETOOTH® Low Energy or BLUETOOTH® Classic antenna, for example). When the start button is operated, the vehicle can measure the signal strength (RSSI (received signal strength indication) value) of the packets received. If these values are below a specific dB threshold value over a specific measurement time, then the mobile device may be in direct proximity to the defined placement position. The cubic drop in signal strength over distance means that, in some exemplary embodiments, a dB threshold value that is constant over several mobile devices can serve as an "In the interior"/"Not in the interior" distinguishing criterion. By way of example, a mobile device can be identified in the interior even if it does not have NFC but rather has only BLUETOOTH® (LE). Since this placement position can be chosen to be in proximity to the center of the vehicle bodywork (e.g., in the central console), it is possible in some exemplary embodiments to ensure that the mobile device is in the vehicle interior. The prerequisite relevant to admission and insurance may be able to be met even with mobile devices that have (exclusively) BLUETOOTH® (Low Energy) radio technology.

In many cases, the customer can leave his conventional vehicle key at home and instead carry a mobile terminal (smartphone, smartwatch, etc.) with digital keyring functionality. Apart from this, nothing changes for the customer in many cases: he can open the vehicle doors using the door handle as usual, for example. To start the engine, however, it may be necessary for the mobile device to be placed on what is known as a coupling box (predetermined placement position) in the central console. The vehicle can detect the local proximity of the mobile device to the BLUETOOTH® (LE) antenna in the coupling box and hence give clearance for engine starting (only) if, besides successful bilateral engine immobilizer authentication, the mobile device has also been found on the coupling box and hence in the vehicle interior. This can meet admission prerequisites and insurance requirement.

Besides a statically coded signal strength value, on the basis of which the vehicle decides whether the mobile device is on the coupling box or not on the coupling box, it is possible for averaging or smoothing algorithms to be used to filter out occasional deviating signal dips. Furthermore, the signal strength values can be received from multiple antennas of the vehicle and optimized by means of difference formation or further algorithms. The disclosed embodiments are not restricted to the use of one particular radio method: all radio methods available in the mobile device can be used for interior detection through signal strength measurement. Use of BLUETOOTH® Low Energy can be used by many mobile devices on account of widespread presence in current mobile devices, and moreover BTLE can offer low quiescent current draw. In addition, it is possible for customers not be restricted to the NFC transmission method, for example, and they can use the function even if the mobile device (mobile communication device) does not have NFC (e.g., as is the case, e.g., with many smartwatches). In future vehicles, exemplary embodiments can allow them to be unlocked and started using mobile terminals as a key substitute.

A further exemplary embodiment is a computer program for performed at least one of the methods described above when the computer program runs on a computer, a processor or a programmable hardware component. A further exemplary embodiment is also a digital storage medium that is machine-readable or computer-readable and that has electronically readable control signals that can interact with a programmable hardware component such that one of the methods described above is carried out.

The features disclosed in the description above, the claims below and the enclosed figure may be of importance, and can be implemented, both individually and in any desired combination, for the realization of an exemplary embodiment in its various configurations.

Although some aspects have been described in connection with an apparatus, it goes without saying that these aspects also represent a description of the corresponding method, so that a block or a component of an apparatus should also be considered as a corresponding method operation or as a feature of a method operation. Analogously to this, aspects described in connection with or as a method operation also represent a description of a corresponding block or detail or feature of a corresponding apparatus.

Depending on the particular implementation requirements, exemplary embodiments may be implemented in hardware or in software. The implementation can be performed using a digital storage medium, for example, a floppy disk, a DVD, a Blu-Ray disk, a CD, a ROM, a PROM, an EPROM, an EEPROM or Flash memory, a hard disk or another magnetic or optical memory that stores electronically readable control signals that can interact or do interact with a programmable hardware component such that the respective method is performed.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single-chip system (SOC=system on chip), a programmable logic element or a field programmable gate array (FPGA) with a microprocessor.

The digital storage medium may therefore be machine- or computer-readable. Some exemplary embodiments thus comprise a data carrier having electronically readable control signals that are able to interact with a programmable computer system or a programmable hardware component in such a way that one of the methods described herein is performed. At least one exemplary embodiment is a data carrier (or a digital storage medium or a computer-readable medium) on which the program for performing one of the methods described herein is recorded.

Generally, exemplary embodiments may be implemented as program, firmware, computer program or computer program product comprising a program code or as data, wherein the program code or the data is or are effective to the extent of performing one of the methods when the program runs on a processor or a programmable hardware component. The program code or the data may, for example, also be stored on a machine-readable carrier or data carrier. The program code or the data may be present, inter alia, as source code, machine code or byte code and as some other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represents the program.

A program according to at least one exemplary embodiment can implement one of the methods while it is performed, for example, by reading memory locations or writing a datum or multiple data thereto, as a result of which, if need be, switching processes or other processes are brought about in transistor structures, in amplifier structures or in other electrical components, optical components, magnetic components or components operating on another functional principle. Accordingly, reading a memory location allows data, values, sensor values or other information to be captured, determined or measured by a program. Therefore, by reading one or more memory locations, a program can capture, determine or measure variables, values, measured variables and other information, and by writing to one or more memory locations, it can bring about, prompt or perform an action and activate other devices, machines and components.

The exemplary embodiments described above are merely an illustration of the principles of the disclosure. It goes without saying that modifications and variations of the arrangements and details described herein will become apparent to other persons skilled in the art. Therefore, the intention is for the disclosure to be restricted only by the scope of protection of the patent claims below, and not by the specific details that have been presented herein on the basis of the description and the explanation of the exemplary embodiments.

LIST OF REFERENCE SYMBOLS

10 Apparatus
12 At least one interface
14 Control module
100 Vehicle
110 Determine
120 Receive
130 Check

The invention claimed is:

1. A method for checking an authorization of a mobile communication device for operating a vehicle engine of a vehicle, the method comprising:
   determining a position of a mobile communication device, wherein the position of the mobile communication device is inside or outside the vehicle, the determining of the position of the mobile communication device corresponding to determining a position of the mobile communication device in or on a wireless charging apparatus of the vehicle;
   receiving a digital key value from the mobile communication device; and checking the authorization of the mobile communication device for operating the vehicle engine, based on the position of the mobile communication device and based on the digital key value;
   wherein the determining of the position of the mobile communication device further comprises varying a radiation characteristic of an antenna unit and capturing information about transmission properties between the antenna unit and the mobile communication device based on the varied radiation characteristic, wherein the determining of the position of the mobile communication device is based on the captured transmission properties.

2. The method of claim 1, wherein the determining of the position of the mobile communication device comprises determining whether the mobile communication device is in a predetermined placement position inside the vehicle.

3. The method of claim 2, wherein the determining of the position of the mobile communication device is based on determining a signal strength of a signal between the mobile communication device and an antenna that is arranged in immediate surroundings of the predetermined placement position.

4. The method of claim 1, wherein the determining of the position of the mobile communication device comprises determining a first signal strength of a signal of the mobile communication device via a first antenna and determining a second signal strength of the signal of the mobile communication device via a second antenna, and wherein the determining of the position of the mobile communication device is based on the first signal strength and the second signal strength.

5. The method of claim 4, wherein the first antenna is an exterior antenna and wherein the second antenna is an interior antenna of the vehicle, and/or
   wherein the signal of the mobile communication device corresponds to a communication by the mobile communication device with a different entity than the vehicle, or wherein the signal of the mobile communication device corresponds to a reference signal of the mobile communication device for the first antenna and the second antenna.

6. The method of claim 4, wherein the signal comprises a carrier frequency of greater than 700 MHz.

7. The method of claim 1, wherein the determining of the position of the mobile communication device further comprises varying a further radiation characteristic of a further antenna unit and capturing information about further transmission properties between the further antenna unit and the mobile communication device based on the varied further radiation characteristic, wherein the determining of the position of the mobile communication device is based on the captured transmission properties and captured further transmission properties.

8. The method of claim 1, wherein the checking of the authorization to operate the vehicle engine acknowledges an authorization, to start the vehicle engine and/or operate the vehicle engine during a journey, in response to the determining of the position of the mobile communication device determining the position of the mobile communication device inside the vehicle and the received key value being valid.

9. The method of claim 1, further comprising:
   checking a further authorization of the mobile communication device for unlocking or locking the vehicle, based on the position of the mobile communication device and based on the digital key value, wherein the checking of the authorization for unlocking or locking the vehicle acknowledges an authorization, to unlock the vehicle and/or lock the vehicle, in response to the determining of the position of the mobile communication device determining a position of the mobile communication device outside the vehicle in proximity to the vehicle and the received key value being valid.

10. The method of claim 1, wherein the mobile communication device corresponds to a programmable mobile phone or a programmable watch, and/or
    wherein the receiving is based on a BLUETOOTH Low Energy system, and/or
    wherein the method further comprises providing a control signal for the vehicle engine, based on the authorization for operating the vehicle engine.

11. The method of claim 1, further comprising obtaining information about a biometric authentication of a user of the mobile communication device, wherein the checking of the authorization of the mobile communication device for operating the vehicle engine is further based on the information about the biometric authentication.

12. A non-transitory storage medium including a program having program code for performing a method for checking an authorization of a mobile communication device for operating a vehicle engine of a vehicle, when the program code is executed on a computer, a processor, a control module or a programmable hardware component, the method comprising:
    determining a position of a mobile communication device, wherein the position of the mobile communication device is inside or outside the vehicle, the determining of the position of the mobile communication device corresponding to determining a position of the mobile communication device in or on a wireless charging apparatus of the vehicle;

receiving a digital key value from the mobile communication device; and checking the authorization of the mobile communication device for operating the vehicle engine, based on the position of the mobile communication device and based on the digital key value;

the determining of the position of the mobile communication device further comprises varying a radiation characteristic of an antenna unit and capturing information about transmission properties between the antenna unit and the mobile communication device based on the varied radiation characteristic, wherein the determining of the position of the mobile communication device is based on the captured transmission properties.

13. An apparatus for checking an authorization of a mobile communication device for operating a vehicle engine of a vehicle, the apparatus comprising:

at least one interface for receiving a digital key value from a mobile communication device; and a control module designed for:

determining a position of the mobile communication device, wherein the position of the mobile communication device is inside or outside the vehicle, the determining of the position of the mobile communication device corresponding to determining a position of the mobile communication device in or on a wireless charging apparatus of the vehicle, checking the authorization of the mobile communication device for operating the vehicle engine, based on the position of the mobile communication device and based on the digital key value, and providing a control signal for the vehicle engine via the at least one interface, based on the authorization for operating the vehicle engine;

wherein the determining of the position of the mobile communication device further comprises varying a radiation characteristic of an antenna unit and capturing information about transmission properties between the antenna unit and the mobile communication device based on the varied radiation characteristic, wherein the determining of the position of the mobile communication device is based on the captured transmission properties.

14. The apparatus of claim 13, wherein the determining of the position of the mobile communication device comprises determining whether the mobile communication device is in a predetermined placement position inside the vehicle.

15. The apparatus of claim 14, wherein the determining of the position of the mobile communication device is based on determining a signal strength of a signal between the mobile communication device and an antenna that is arranged in immediate surroundings of the predetermined placement position.

16. The apparatus of claim 13, wherein the determining of the position of the mobile communication device comprises determining a first signal strength of a signal of the mobile communication device via a first antenna and determining a second signal strength of the signal of the mobile communication device via a second antenna, and wherein the determining of the position of the mobile communication device is based on the first signal strength and the second signal strength.

17. The apparatus of claim 16, wherein the first antenna is an exterior antenna and wherein the second antenna is an interior antenna of the vehicle, and/or wherein the signal of the mobile communication device corresponds to a communication by the mobile communication device with a different entity than the vehicle, or wherein the signal of the mobile communication device corresponds to a reference signal of the mobile communication device for the first antenna and the second antenna.

18. The apparatus of claim 16, wherein the signal comprises a carrier frequency of greater than 700 MHz.

19. The apparatus of claim 13, wherein the determining of the position of the mobile communication device further comprises varying a further radiation characteristic of a further antenna unit and capturing information about further transmission properties between the further antenna unit and the mobile communication device based on the varied further radiation characteristic, wherein the determining of the position of the mobile communication device is based on the captured transmission properties and captured further transmission properties.

20. The apparatus of claim 13, wherein the checking of the authorization to operate the vehicle engine acknowledges an authorization, to start the vehicle engine and/or operate the vehicle engine during a journey, in response to the determining of the position of the mobile communication device determining the position of the mobile communication device inside the vehicle and the received key value being valid.

21. The apparatus of claim 13, wherein the method includes checking a further authorization of the mobile communication device for unlocking or locking the vehicle, based on the position of the mobile communication device and based on the digital key value, wherein the checking of the further authorization for unlocking or locking the vehicle acknowledges an authorization, to unlock the vehicle and/or lock the vehicle, in response to the determining of the position of the mobile communication device determining a position of the mobile communication device outside the vehicle in proximity to the vehicle and the received key value being valid.

22. The apparatus of claim 13, wherein the mobile communication device corresponds to a programmable mobile phone or a programmable watch, and/or wherein the receiving is based on a BLUETOOTH Low Energy system, and/or wherein the method further comprises providing a control signal for the vehicle engine, based on the authorization for operating the vehicle engine.

23. The apparatus of claim 13, the method including obtaining information about a biometric authentication of a user of the mobile communication device, wherein the checking of the authorization of the mobile communication device for operating the vehicle engine is further based on the information about the biometric authentication.

24. The non-transitory storage medium of claim 12, wherein the determining of the position of the mobile communication device comprises determining whether the mobile communication device is in a predetermined placement position inside the vehicle.

25. The non-transitory storage medium of claim 24, wherein the determining of the position of the mobile communication device is based on determining a signal strength of a signal between the mobile communication device and an antenna that is arranged in immediate surroundings of the predetermined placement position.

26. The non-transitory storage medium of claim 12, wherein the determining of the position of the mobile communication device comprises determining a first signal strength of a signal of the mobile communication device via a first antenna and determining a second signal strength of the signal of the mobile communication device via a second antenna, and wherein the determining of the position of the mobile communication device is based on the first signal strength and the second signal strength.

27. The non-transitory storage medium of claim 26, wherein the first antenna is an exterior antenna and wherein the second antenna is an interior antenna of the vehicle, and/or wherein the signal of the mobile communication device corresponds to a communication by the mobile communication device with a different entity than the vehicle, or wherein the signal of the mobile communication device corresponds to a reference signal of the mobile communication device for the first antenna and the second antenna.

28. The non-transitory storage medium of claim 26, wherein the signal comprises a carrier frequency of greater than 700 MHz.

29. The non-transitory storage medium of claim 12, wherein the determining of the position of the mobile communication device further comprises varying a further radiation characteristic of a further antenna unit and capturing information about further transmission properties between the further antenna unit and the mobile communication device based on the varied further radiation characteristic, wherein the determining of the position of the mobile communication device is based on the captured transmission properties and captured further transmission properties.

30. The non-transitory storage medium of claim 12, wherein the checking of the authorization to operate the vehicle engine acknowledges an authorization, to start the vehicle engine and/or operate the vehicle engine during a journey, in response to the determining of the position of the mobile communication device determining the position of the mobile communication device inside the vehicle and the received key value being valid.

31. The non-transitory storage medium of claim 12, the method including checking a further authorization of the mobile communication device for unlocking or locking the vehicle, based on the position of the mobile communication device and based on the digital key value, wherein the checking of the further authorization for unlocking or locking the vehicle acknowledges an authorization, to unlock the vehicle and/or lock the vehicle, in response to the determining of the position of the mobile communication device determining a position of the mobile communication device outside the vehicle in proximity to the vehicle and the received key value being valid.

32. The non-transitory storage medium of claim 12, wherein the mobile communication device corresponds to a programmable mobile phone or a programmable watch, and/or wherein the receiving is based on a BLUETOOTH Low Energy system, and/or wherein the method further comprises providing a control signal for the vehicle engine, based on the authorization for operating the vehicle engine.

33. The non-transitory storage medium of claim 12, the method including obtaining information about a biometric authentication of a user of the mobile communication device, wherein the checking of the authorization of the mobile communication device for operating the vehicle engine is further based on the information about the biometric authentication.

34. An apparatus for checking an authorization of a mobile communication device for operating a vehicle engine of a vehicle, the apparatus comprising:
at least one interface for receiving a digital key value from a mobile communication device; and
a control module designed for:
determining a position of the mobile communication device in or on a wireless charging apparatus of the vehicle,
checking the authorization of the mobile communication device for operating the vehicle engine, based on the position of the mobile communication device and based on the digital key value, and
providing a control signal for the vehicle engine, based on the authorization for operating the vehicle engine;
wherein the determining of the position of the mobile communication device further comprises varying a radiation characteristic of an antenna unit and capturing information about transmission properties between the antenna unit and the mobile communication device based on the varied radiation characteristic, wherein the determining of the position of the mobile communication device is based on the captured transmission properties.

* * * * *